United States Patent
Karasev et al.

(10) Patent No.: US 11,403,389 B2
(45) Date of Patent: Aug. 2, 2022

(54) SYSTEM AND METHOD OF DETECTING UNAUTHORIZED ACCESS TO COMPUTING RESOURCES FOR CRYPTOMINING

(71) Applicant: Acronis International GmbH, Schaffhausen (CH)

(72) Inventors: Vadim Karasev, Moscow (RU); Sergey Lebedev, Moscow (RU); Ravikant Tiwari, Moscow (RU); Oleg Ishanov, Moscow (RU); Evgeny A Aseev, Moscow (RU); Vladimir Strogov, Moscow (RU); Serguei Beloussov, Costa Del Sol (SG); Stanislav Protasov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 28 days.

(21) Appl. No.: 16/893,647

(22) Filed: Jun. 5, 2020

(65) Prior Publication Data
US 2020/0387597 A1    Dec. 10, 2020

Related U.S. Application Data

(60) Provisional application No. 62/858,517, filed on Jun. 7, 2019.

(51) Int. Cl.
*G06F 21/52* (2013.01)
*G06F 21/56* (2013.01)
*H04L 9/40* (2022.01)

(52) U.S. Cl.
CPC ............ *G06F 21/52* (2013.01); *G06F 21/565* (2013.01); *H04L 63/1408* (2013.01); *G06F 2221/033* (2013.01)

(58) Field of Classification Search
CPC .. G06F 21/52; G06F 21/565; G06F 2221/033; H04L 63/1408
See application file for complete search history.

(56) References Cited

U.S. PATENT DOCUMENTS

| | | | |
|---|---|---|---|
| 2017/0063902 A1* | 3/2017 | Muddu | H04L 41/22 |
| 2018/0091559 A1* | 3/2018 | Luger | H04L 63/145 |
| 2019/0190928 A1* | 6/2019 | Anderson | H04L 9/3242 |
| 2019/0205511 A1* | 7/2019 | Zhan | H04L 63/102 |
| 2020/0034530 A1* | 1/2020 | Zasadzinski | G06F 21/554 |

* cited by examiner

*Primary Examiner* — Ashokkumar B Patel
*Assistant Examiner* — William B Jones
(74) *Attorney, Agent, or Firm* — ArentFox Schiff LLP; Michael Fainberg

(57) ABSTRACT

Disclosed herein are systems and method for detecting unauthorized access to computing resources for cryptomining. In one exemplary aspect, a method may detect that at least one process has been launched on a computer system. In response to the detecting, the method may collect data related to the launch of the at least one process. The method may compare the collected data with behavioral rules specifying compliant behavior on the computer system. The method may identify suspicious behavior associated with the at least one process in response to determining that the collected data does not meet the behavioral rules. The method may generate an alert indicative of the suspicious behavior. In response to identifying the suspicious behavior, the method may obtain telemetry data of the computer system, and may update the behavioral rules based on the telemetry data to improve accuracy of identifying further suspicious behavior.

20 Claims, 7 Drawing Sheets

SYSTEM AND METHOD OF DETECTING UNAUTHORIZED ACCESS TO COMPUTING RESOURCES FOR CRYPTOMINING

CROSS-REFERENCE TO RELATED APPLICATIONS

This application claims the benefit of U.S. Provisional Application No. 62/858,517, filed Jun. 7, 2019, which is herein incorporated by reference.

FIELD OF TECHNOLOGY

The present disclosure relates generally to the field of malicious software detection, and more specifically, to systems and method of detecting unauthorized access to computing resources for cryptomining.

BACKGROUND

A recent development in malicious applications is the creation of cryptominer software that is illicitly deployed to access power and resources from home user and enterprises to mine for cryptocurrency. According to different researchers roughly 400,000 samples of cryptomining malware were detected worldwide in the fourth quarter of 2017, which exploded by a shocking 629 percent to more than 2.9 million samples in Q1 2018. Q2 saw an increase of 86 percent, representing more than 2.5 million new samples.

Like ransomware, cryptominers are not a new phenomenon. There are many existing examples of the use of computer resources to mine cryptocurrency such as Bitcoin without the help of specialized or powerful hardware. Cybercriminals only began developing malware to perform this function in the wake of the boom in cryptocurrencies in mid-to-late 2017. At that time, thousands of different blockchain-based digital currencies appeared, many of them rocketing upward in volume and capitalization, with some of them able to be mined with ordinary computer resources.

Cryptomining is one of the foundations of any cryptocurrency as it provides the processing horsepower necessary to verify previous transactions in the cryptocurrency. This verification process ensures the integrity of the digital currency. Cryptominers use their computers' resources to solve complex mathematical problems. The first miner to solve the problem gets paid for their efforts in the same cryptocurrency. An additional task during protection against cryptomining is to automatically distinguish unauthorized cryptomining from similar authorized operations, because the user can, on his own will, run cryptomining programs (or applications similar to them) on his or her computer.

Since cryptominers do not belong to malware in the typical sense of the word, cryptominers are difficult to detect and deactivate using standard antivirus software that is generally based on signature verification and regularly updated malware databases. Creating many varieties of cryptominers is very easy and quick, which further makes verifying cryptominers with black and white lists ineffective.

Therefore, effective detection techniques are needed to prevent unauthorized access to computing resources.

SUMMARY

To address these needs, aspects of the present disclosure describe methods and systems for detecting unauthorized access to computing resources for cryptomining.

In one exemplary aspect, a method may detect that at least one process has been launched on a computer system. In response to the detecting, the method may collect data related to the launch of the at least one process. The method may compare the collected data with behavioral rules specifying compliant behavior on the computer system. The method may identify suspicious behavior associated with the at least one process in response to determining that the collected data does not meet the behavioral rules. The method may generate an alert indicative of the suspicious behavior. In response to identifying the suspicious behavior, the method may obtain telemetry data of the computer system, and may update the behavioral rules based on the telemetry data to improve accuracy of identifying further suspicious behavior.

In some aspects, the method may end the at least one process in response to identifying the suspicious behavior.

In some aspects, the telemetry data comprises system data for a period of time between when the at least one process was launched and when the at least one process was ended. Furthermore, updating the behavior rules based on the telemetry data may comprises receiving a confirmation that the suspicious behavior is associated with a cryptominer, and tagging the telemetry data as characteristics of a cryptominer intrusion. The method may receive additional telemetry data from another computer system, wherein the additional telemetry data comprises additional characteristics of a cryptominer intrusion. The method may identify common characteristics between the telemetry data and the additional telemetry data, and may update the behavior rules to capture the common characteristics.

In some aspects, updating the behavior rules to capture the common characteristics comprises at least one of narrowing broad parameters of an existing rule of the behavior rules to fit within a parameter range indicated by the common characteristics, and adding a new rule to the behavior rule that evaluates parameters in the common characteristics.

In some aspects, the behavioral rules are structured instructions comprising one or more of CPU load percentage of an application, port ranges to be tracked, IP addresses, and command line options.

In some aspects, the behavioral rules indicate ranges or values for parameters that are acceptable and conform to non-suspicious behavior on the computer system.

In some aspects, the collected data comprises one or more of command line usage, network usage, CPU consumption, process information, interceptors and event tracing.

In some aspects, the at least one process excludes whitelisted and/or signed applications.

In some aspects, the method may analyze network traffic incoming from a network to the computer system. The method may determine one or more network addresses from which incoming files are being received and downloaded at the computer system. The method may detect the incoming files from the one or more network addresses that do not have a signature. The method may scan the incoming files for viruses and malicious software, and may establishing a danger rating for a source associated with the one or more network addresses based on the scanning. The method may further determine whether the danger rating is greater than a threshold danger rating. In response to determining that the danger rating is greater than the threshold danger rating, the method may stop activity of the incoming files on the computer system.

In some aspects, the method may determine the one or more network addresses using a network protocol analyzer.

In some aspects, monitoring the behavior of the incoming files comprises at least one of monitoring an application using a file system filter, and monitoring a dynamically linked library by tracing behavior of the DLL using a hash sum of the DLL.

In some aspects, the incoming files are DLLs, and the method may determine that the incoming file is a cryptominer when the incoming files perform one or more of the following: load the CPU past a predetermined threshold, use the command line, and access suspicious network addresses.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product of detecting unauthorized access to computing resources for cryptomining. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
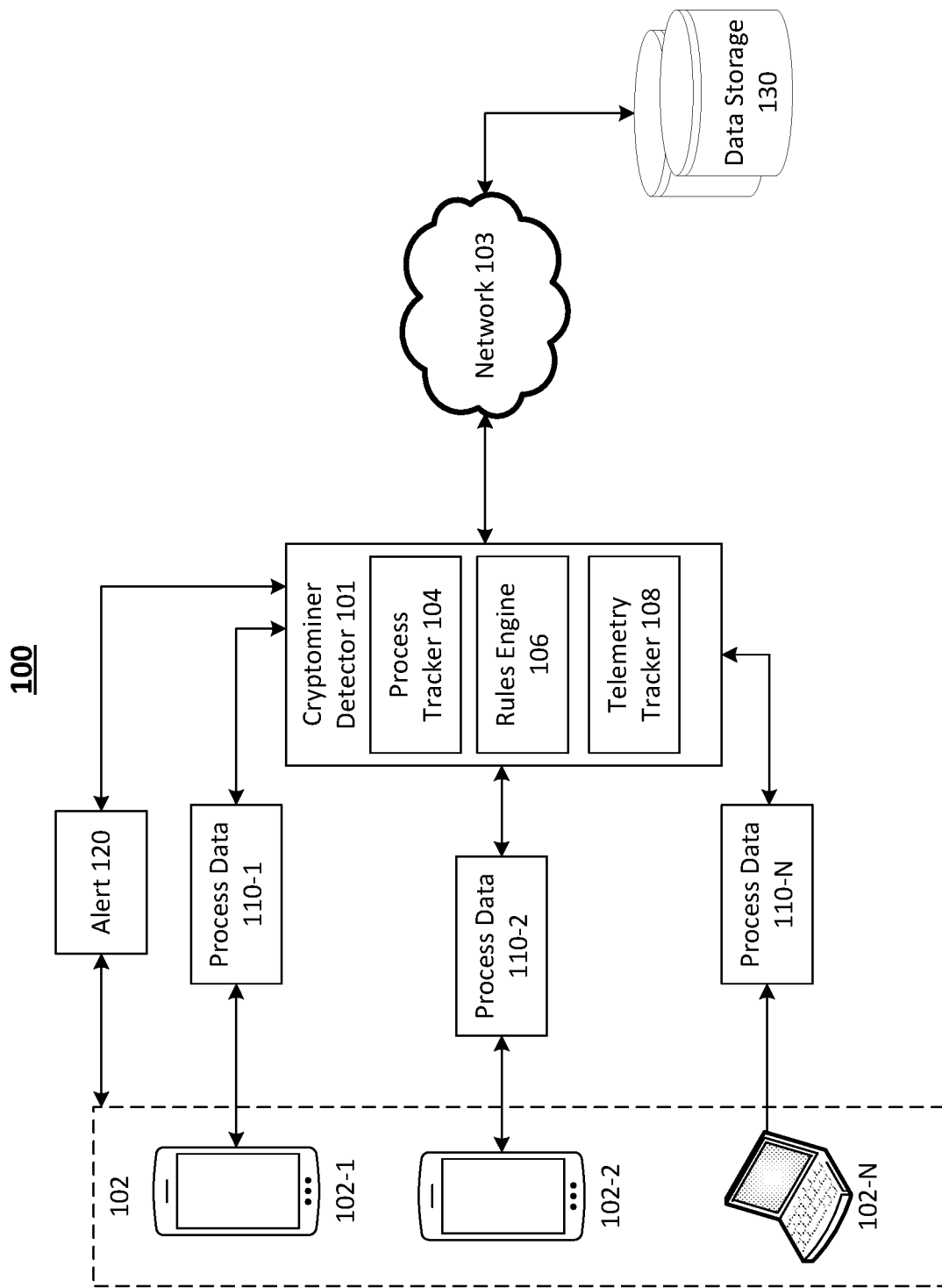
FIG. 1 is a block diagram of a system of detecting unauthorized access to computing resources for cryptomining, in accordance with exemplary aspects of the present disclosure.

FIG. 1 is an block diagram of a system 100 of detecting unauthorized access to computing resources for cryptomining, in accordance with exemplary aspects of the present disclosure.

The system 100 comprises a cryptominer detector 101, a plurality of computing devices 102-1, 102-2 to 102-N (collectively referred to as computing devices 102), a network 103, and data storage 130.

In exemplary aspects, the cryptominer detector 101 comprises a process tracker 104, a rules engine 106, and a telemetry tracker 108. In some aspects, the cryptominer detector 101 operates as a client on each individual computing device, while in other aspects the cryptominer detector 101 is provided as a service that scans a portion of devices across a network, company or the like (e.g., via a remote server). The tradeoff here is that when the detector 101 is a client installed on each device, collection and analysis can be performed quickly, but takes up space on each individual device. On the other hand, when the detector 101 is provided as a service, it may take longer to perform scans, but resources of the computing devices 102 may be preserved, whether CPU, storage, or the like.

The process tracker 104 detects the launch of a processes on a computer system and monitors the launched processes. In one aspect, the process tracker 104 specifically detects the launch of processes that are not whitelisted and/or signed applications because these applications are generally trusted and authorized by a user or administrator to run on the computer system, e.g., computing device 102-1 to 102-N. The process tracker 104 receives process data 110-1, 110-2 to 110-N (otherwise referred to as process data 110) from each of the computing devices 102 being tracked, either over network 103, or individually at each device where the cryptominer detector 101 is installed.

The cryptominer detector 101 collects the process data 110 related to the launch of each detected process. In one aspect, the process data 110 comprises one or more of (1) command line usage (e.g., commands used to launch the process), (2) network usage (e.g., whether the process begins receiving/transmitting data over a network, what the data looks like, who is the data being sent to or received from, etc.), (3) CPU consumption (e.g., the percentage of CPU being consumed), (4) process information (e.g., information about threads associated with the process, how the process is interacting with other processes, what the process is specifically doing, etc.), (5) interceptor patterns (e.g., whether the process is changing the processing cycle of a software), and (6) event tracing (e.g., a log of kernel or application-defined events). This process data may be stored in data storage 130 for future analysis, may be analyzed as it is received, may be analyzed according to a schedule determined by an administrator, and/or as determined through machine learning to be the most resource effective scheduling. In some aspects, the process data 110 represents information gathered about a launched process over a period of time (e.g., the period from when a launch was requested until the process was fully running).

The rules engine 106 compares the collected data with behavioral rules specifying compliant behavior on the computer system. In exemplary aspects, the behavioral rules are structured instructions comprising one or more of CPU load percentage of an application, port ranges to be tracked, IP addresses, and command line options. The behavioral rules indicate ranges or values for parameters that are acceptable and conform to non-suspicious behavior on the computer system. For example, a rule may be: "if: CPU load percentage >80, for newly installed application; then: alert suspicious behavior; else: normal behavior." Another rule may be "if: IP address is XX.XXX.XXX.XXX; then: alert suspicious behavior; else: normal behavior." Another rule may be "if: new item created in directory XYZ; then: alert suspicious behavior; else: normal behavior." In the first rule, newly installed applications may be limited to a CPU load percentage of 80%. In the second rule, a specific IP address is flagged such that data packets received from the IP address should be untrusted (e.g., when a cryptominer remotely accesses the computer system). In the third rule, no new items should be created in a protected directory. If a new item is detected, it is possible that a cryptominer is attempting to access the computer system. It should be noted that these rules are simply examples. A person skilled in the art will appreciate that a variety of rules may exist and some may be more complicated with multiple "if" criteria in a single rule.

Ultimately, the rules engine 106 identifies suspicious behavior when the collected data does not conform to the behavioral rules. The cryptominer detector 101 generates an alert indicative of the suspicious behavior associated with the detected processes (e.g., for an administrator of the computer system). In some aspects, this alert takes the form of an email, a text message, a push notification or the like, though the disclosure is not limited thereto.

The telemetry tracker 108 of cryptominer detector 101 obtains telemetry data of the computer devices 120 in response to identifying suspicious behavior, in order to improve cryptomining detection. In exemplary aspects, telemetry data of the computer system is data gathered from customers that have opted in to participate in customer experience programs that are offered occasionally from companies. Telemetry data comprises information about tracked events, cryptomining detections (in both silent and alert mode), and other information for developers and analysts. When enough telemetry data is gathered (e.g., greater than a predefined amount or type of data), the telemetry tracker 108 analyzes the telemetry data and adjusts existing detection rules in rule engine 106 or introduces new ones.

In some aspects, the telemetry data is analyzed through machine learning and artificial intelligence to recognize patterns within the data, as suspicious or cryptomining activity is detected, and detection rules are either updated or newly created. New rules are automatically propagated to an endpoint via an update workflow. The cryptominer detector 101 updates the behavioral rules in rule engine 106 based on the collected telemetry data to improve accuracy of identifying suspicious behavior. In some aspects, updating the rules may comprise changing a range of parameter values, or setting a particular value for a parameter, or the like based either on manual analysis or automated analysis, or a combination of a both.

More specifically, the telemetry data comprises system data for a period of time between when the at least one process was launched and when the at least one process was ended. For example, a process may begin at 1:00 pm and in response to being labelled suspicious behavior, the process may be ended at 1:03 pm. During this three-minute period telemetry data may be collected and stored. The telemetry data may include, but is not limited to, CPU load percentage, memory allocation (e.g., RAM), a read/write log (e.g., to track new objects being created in various directories of the computer system), thread creation, process chains, network parameter log (e.g., the number of data packets received and from where), and power information.

Updating the behavior rules based on the telemetry data, in some aspects, may comprise receiving a confirmation that the suspicious behavior is associated with a cryptominer. For example, a user may manually verify whether the suspicious behavior was caused by the user or not. In some aspects, the alert generated for the administrator may include a query requesting this confirmation. In response to receiving the confirmation that the user was not involved with the suspicious behavior, the cryptominer detector 101 may tag the telemetry data as characteristics of a cryptominer intrusion. The cryptominer detector 101 may receive additional telemetry data from another computer system (where the additional telemetry data includes additional characteristics of a cryptominer intrusion). The another computer system (e.g., 102-1) may be of a completely different user unassociated with the computer system in question (e.g., 102-2). Tagged telemetry data may be stored on a central server. It should be noted that the cryptominer detector 101 may receive telemetry data from a plurality of computer systems. For simplicity, only two computer systems are considered.

The cryptominer detector 101 may identify common characteristics between the telemetry data and the additional telemetry data. For example, both systems may be targeted by a cryptominer that exceeded a CPU load percentage. One computer system may have experienced a peak 90% load percentage for 30 seconds continuously and another computer system may have experienced a 89% load percentage for 25 seconds continuously. Using machine learning, the cryptominer detector 101 may identify a correlation between the two datasets and update the behavior rules. In some aspects, the cryptominer detector 101 may compare the two datasets for trends and patterns by calculating statistics for various subset periods of time within the full period of time (e.g., the standard deviation of CPU load percentage over various 30-second time periods within the full period of time across which telemetry data was collected).

The cryptominer detector 101 may then update the behavior rules to capture the common characteristics. In some aspects, the cryptominer detector 101 may narrow/broaden parameters of an existing rule of the behavior rules to fit within a parameter range indicated by the common characteristics. Referring to the example of CPU load percentage, the initial rule may indicate that a CPU load percentage greater than 90% is suspicious. An updated version of this rule may indicate that a CPU load percentage greater than 89% for 25 seconds or more is suspicious. In some aspects, the cryptominer detector 101 may add a new rule to the behavior rule that evaluates parameters in the common characteristics. For example, when comparing the telemetry data of the computer system and the another computer system, the cryptominer detector 101 may determine that both systems received data packets from a particular IP address. If the IP address is not previously flagged as suspicious in an existing rule, the cryptominer detector 101 may create a new rule that flags the IP address.

Figure 2:
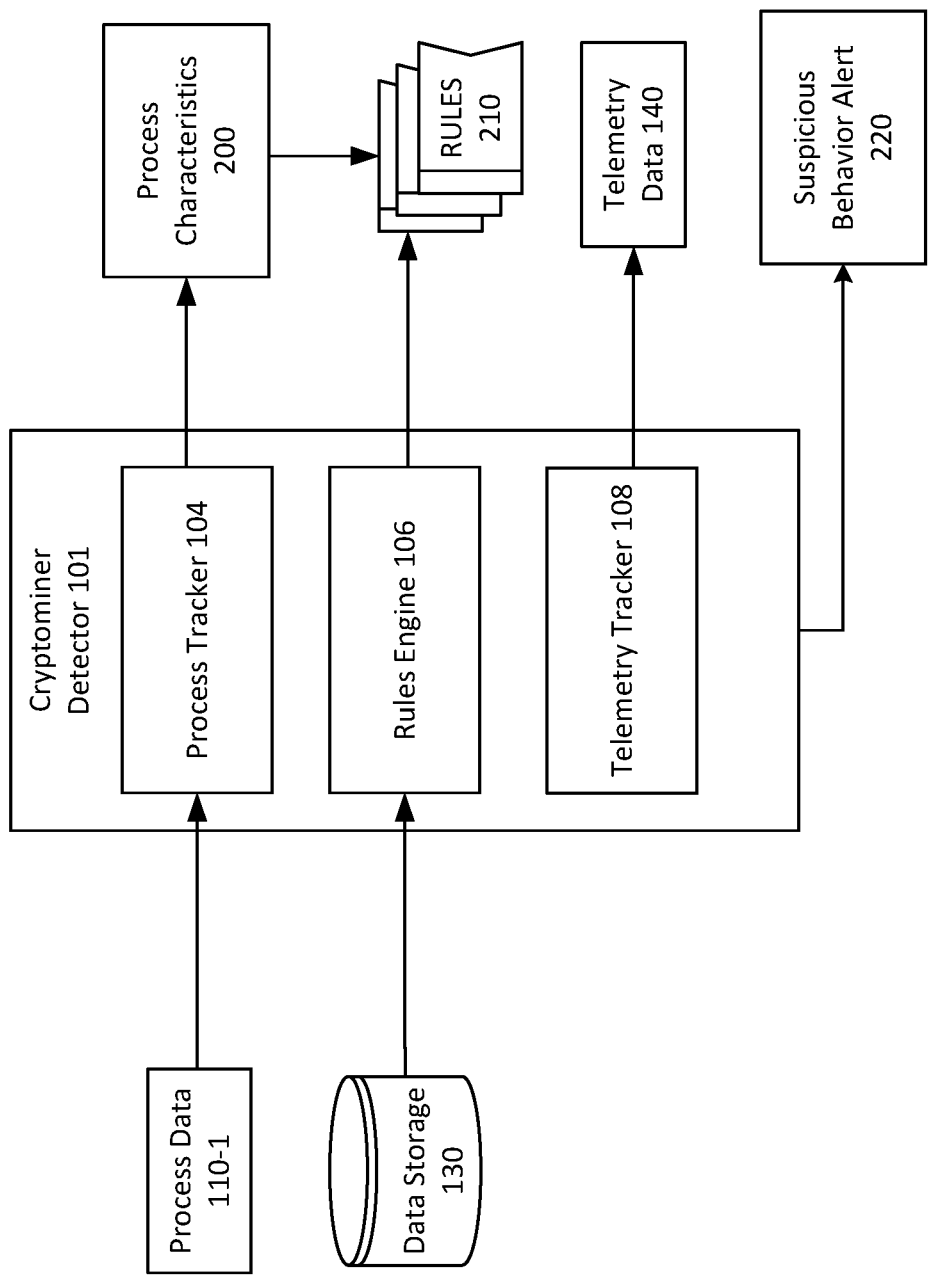
FIG. 2 is a block diagram of the cryptominer detector, according to exemplary aspects of the disclosure.

FIG. 2 is a block diagram of the cryptominer detector 101, according to exemplary aspects of the disclosure.

As described above, the process tracker 104 receives or collects process data such as process data 110-1. This process data is then analyzed by the process tracker 104 to generate process characteristics 200. The process characteristics 200 may include normalized information about the process such as the CPU usage, command line usage and or other information the cryptominer detector 101 can use to detect cryptominer software. For example, process data 110-1 may include a data structure listing the CPU usage percentage over a period of time and timestamps. Process tracker 104 may filter out this data by determining the largest CPU usage percentage over the period of time, the average CPU usage percentage, the lowest CPU usage percentage, etc. These processes values (e.g., the average percentage) are stored in process characteristics 200.

Concurrently, the rules engine 106 may retrieve rules 210 from data storage. In some aspects, the rules 210 are stored on data storage 130, though the rules may alternatively be retrieved from an external source. In exemplary aspects, the rules are in the form of an XML file, defining various logical parameters and other data, which is used by the rules engine 106 to detect cryptominers. For example, in such a file are indicated:

CPU load percentage, like <Condition xsi: type="cp: CPUUsage">
Port ranges that can be tracked, like <Condition xsi: type="cp: Ports">
IP address—<Condition xsi: type="cp: IPv4Addresses">
command line call options—<Condition xsi: type="cp: CommandLine">

Other parameters may also be included and the present disclosure does not limit the parameters hereto.

Once a pattern defined in the rules 210 is matched by the process characteristics 200, the cryptominer detector 101 issues a suspicious behavior alert 220. In further aspects, the cryptominer detector 101 obtains telemetry data 140 for the computing devices 102 to aid in the identification of suspicious behavior, and/or to modify the rules 210 to improve identification of suspicious behavior. Furthermore, the rules engine 106 can be further configured to periodically scan security research databases to identify new information to update rules 210.

Figure 3:
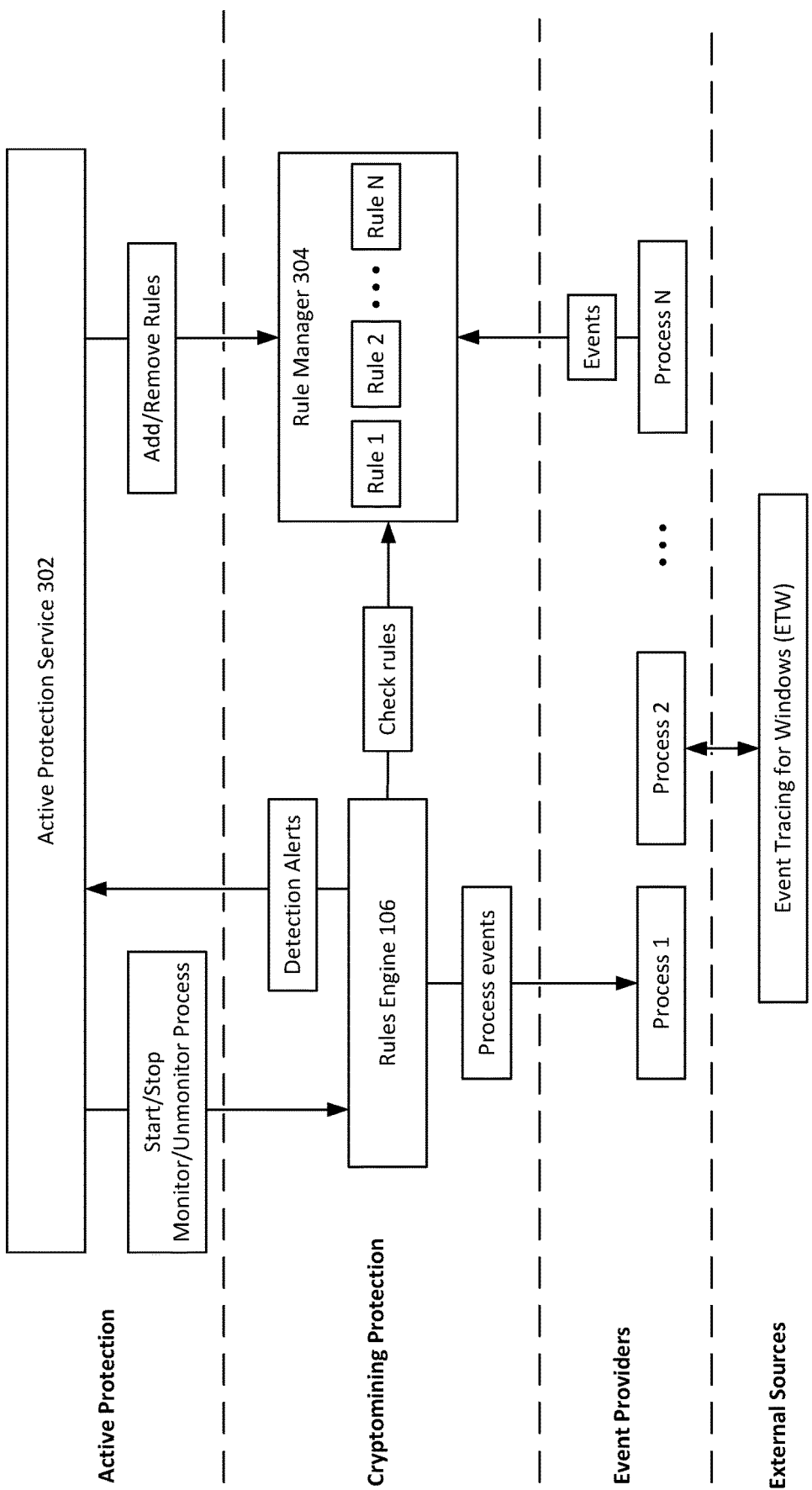
FIG. 3 is a sequence diagram illustrating the flow of detecting cryptominer software, according to exemplary aspects of the present disclosure.

FIG. 3 is a sequence diagram illustrating the flow of detecting cryptominer software, according to exemplary aspects of the present disclosure.

In exemplary aspects, the cryptominer detector 101 provides several layers for protection of the computer system. The first layer is the active protection layer, which includes an active protection service 302 that starts monitoring or stops monitoring of one or more processes executing on an underlying computer system, such as computing devices 102. Process tracker 104 may be comprised in the active protection layer and provides the active protection service 302. The second layer is for cryptomining protection and includes the rules engine 106 along with a rule manager 304. In some aspects, the rules engine 106 comprises the rule manager 304, while in other aspects, the rule manager 304 is stored in data storage 130. The third layer includes event providers (i.e., processes), and the fourth layer includes external sources such as event tracing for Windows® (ETW).

The active protection service 302 starts or stops monitoring processes and passes control to the rules engine 106. The monitoring generates process data (e.g., process data 110), which may be processed by process tracker 104 to yield process characteristics 200. The rules engine 106 compares the process characteristics 200 with the criteria for rules stored in the rule manager 304. The rule manager 304 may include rules 1 to N, and the active protection service 302 also may add or remove behavioral rules in the rule manager 304 (e.g., based on telemetry data). The processes 1, 2, ... N generate events. The rule manager 304 receives the events and the rules engine 106 determines whether any of the events match the rules 1 to N. In some aspects, an event tracker such as ETW® is used to track and trace the events generated by the processes 1 to N.

Figure 4:
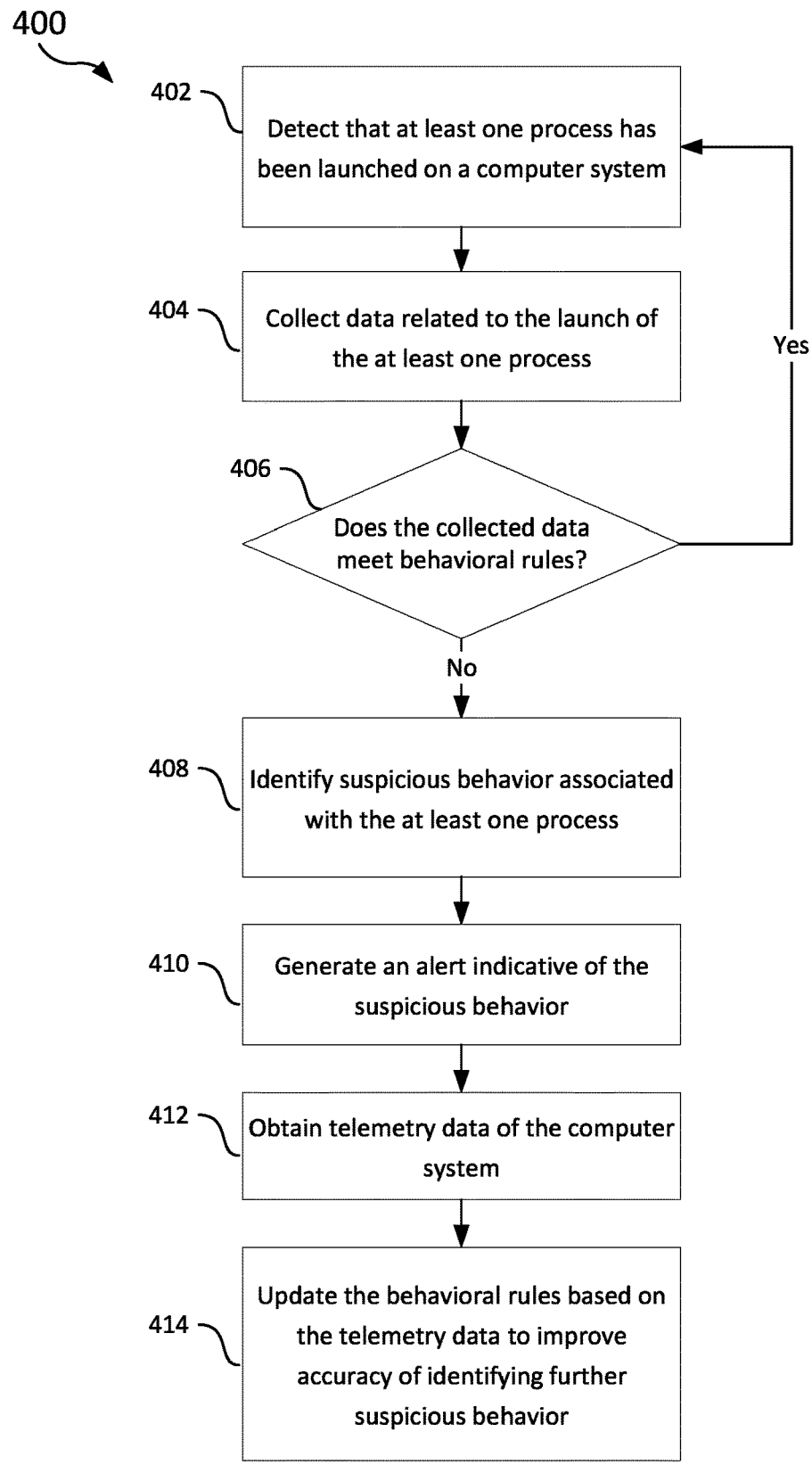
FIG. 4 is a flowchart illustrating a method of detecting unauthorized access to computing resources for cryptomining, in accordance with exemplary aspects of the present disclosure.

FIG. 4 is a flowchart illustrating a method 400 of detecting unauthorized access to computing resources for cryptomining, in accordance with exemplary aspects of the present disclosure.

At 402, the cryptominer detector 101 detects that at least one process has been launched on a computer system. In one aspect, the at least one process excludes whitelisted and/or signed applications.

At 404, the cryptominer detector 101 collects data related to the launch of the at least one process. In one aspect, the collected data comprises one or more of command line usage, network usage, CPU consumption, process information, interceptors and event tracing.

At 406, the cryptominer detector 101 compares the collected data with behavioral rules specifying compliant behavior on the computer system and determines whether the collected data meets the behavioral rules. In exemplary aspects, the behavioral rules are structured instructions comprising one or more of CPU load percentage of an application, port ranges to be tracked, IP addresses, and command line options. The behavioral rules indicate ranges or values for parameters that are acceptable and conform to non-suspicious behavior on the computer system.

At 408, the cryptominer detector 101 identifies suspicious behavior associated with the at least one process in response to determining that the collected data does not meet the behavioral rules. In one aspect, the suspicious behavior comprises behavior that does not conform to the behavioral rules. In one aspect, in response to determining that the behavioral rules are met, method 400 returns to 402, where the cryptominer detector 101 detects other processes being launched on the computer system.

At 410, the cryptominer detector 101 generates an alert indicative of the suspicious behavior (e.g., to alert an administrator of the computer system). In some aspects, this alert takes the form of an email, a text message, a push notification or the like, though the disclosure is not limited thereto.

At 412, the cryptominer detector 101 obtains telemetry data of the computer system after suspicious behavior is identified. In exemplary aspects, telemetry data of the computer system comprises information about tracked events, cryptomining detections (in both silent and alert mode), and other information for developers, analysts, and the system 100 to further analyze.

At 414, the cryptominer detector 101 updates the behavioral rules based on the telemetry data to improve the accuracy of identifying suspicious behavior. In some aspects, updating the rules may comprise changing a range of parameter values, or setting a particular value for a parameter, or the like.

Figure 5:
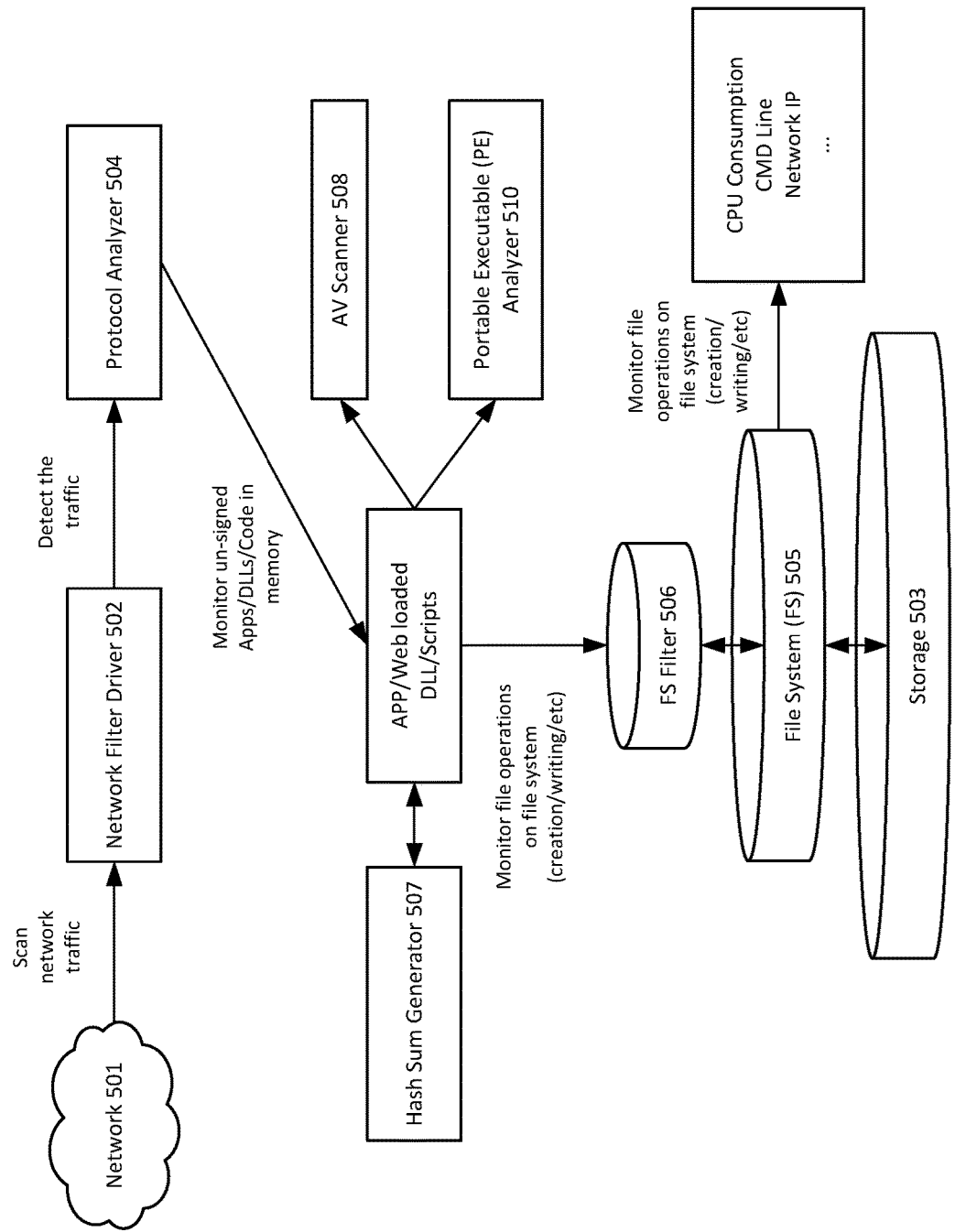
FIG. 5 is a diagram illustrating the components used when detecting unauthorized access to computing resources for cryptomining over a network, according to exemplary aspects of the disclosure.

FIG. 5 is a diagram illustrating the components used when detecting unauthorized access to computing resources for cryptomining over a network, according to exemplary aspects of the disclosure.

In some aspects, malicious sources may transmit files to a computing device over network 501 (e.g., a wide area network (WAN) such as the Internet) for cryptomining without authorization from the user/administrator of the device. For example, as illustrated in FIG. 5 a network filter driver 502 may be used to scan network traffic. The cryptominer detector 101 may also detect file traffic in order to determine whether files are being transferred to the computing device. In some aspects, file traffic is detected using a protocol analyzer 504 that can inspect various protocols and identify file transfer protocols. The protocol analyzer 504 monitors the file traffic and also detects applications, dynamically linked libraries (DLLs) and other portions of code in memory that are unsigned. Such unsigned code and/or scripts may be loaded, for example in a web browser as a plugin or the like. In some aspects, network filter driver 502 and protocol analyzer 504 are sub-modules of process tracker 104.

The code portions are subjected to antivirus (AV) scans by AV scanner 508 and artificial intelligence powered machine analysis by portable executable (PE) analyzer 510 based on executable file structure and file data. PE analyzer 510 may examine file structure for anomalies or suspicious structures, suspicious concatenated or hidden data, or the like. In some aspects, AV scanner 508 and PE analyzer 510 may be submodules of rules engine 106. For example, the detection of anomalies and malware may be associated with a rule that triggers an indication of suspicious behavior. Furthermore, a hash sum is calculated by hash sum generator 507 for the unsigned code for inclusion in telemetry data. In some aspects, the hash sum is an SHA-256 hash sum, though the present disclosure is not limited thereto and any hash/check sum may be used. In some aspects, the hash sum generator 507 is a submodule of telemetry tracker 108. The cryptominer detector 101 further monitors file operations on the file system 505 such as file creation, file writing, and the like for files on storage 503. This may be performed using a file system filter 506. In exemplary aspects, the file system filter 506 may monitor CPU consumption, command line usage, network usage or the like of the unsigned code, and in some examples may use the hash sum to identify the unsigned code in unknown operations. In some aspects, the FS filter 505 may be a submodule of process tracker 104.

In exemplary aspects if a file or process is loaded onto a computer from a network, and if there are a number of suspicious signs, the file can be identified as having a high probability of being a cryptominer not authorized by the user. In some examples, the number of suspicious signs include high CPU consumption, lack of an active graphical window in a display of the computing device, attempts to inject code into other executables threads, network calls to known cryptomining pools, and/or the like.

Figure 6:
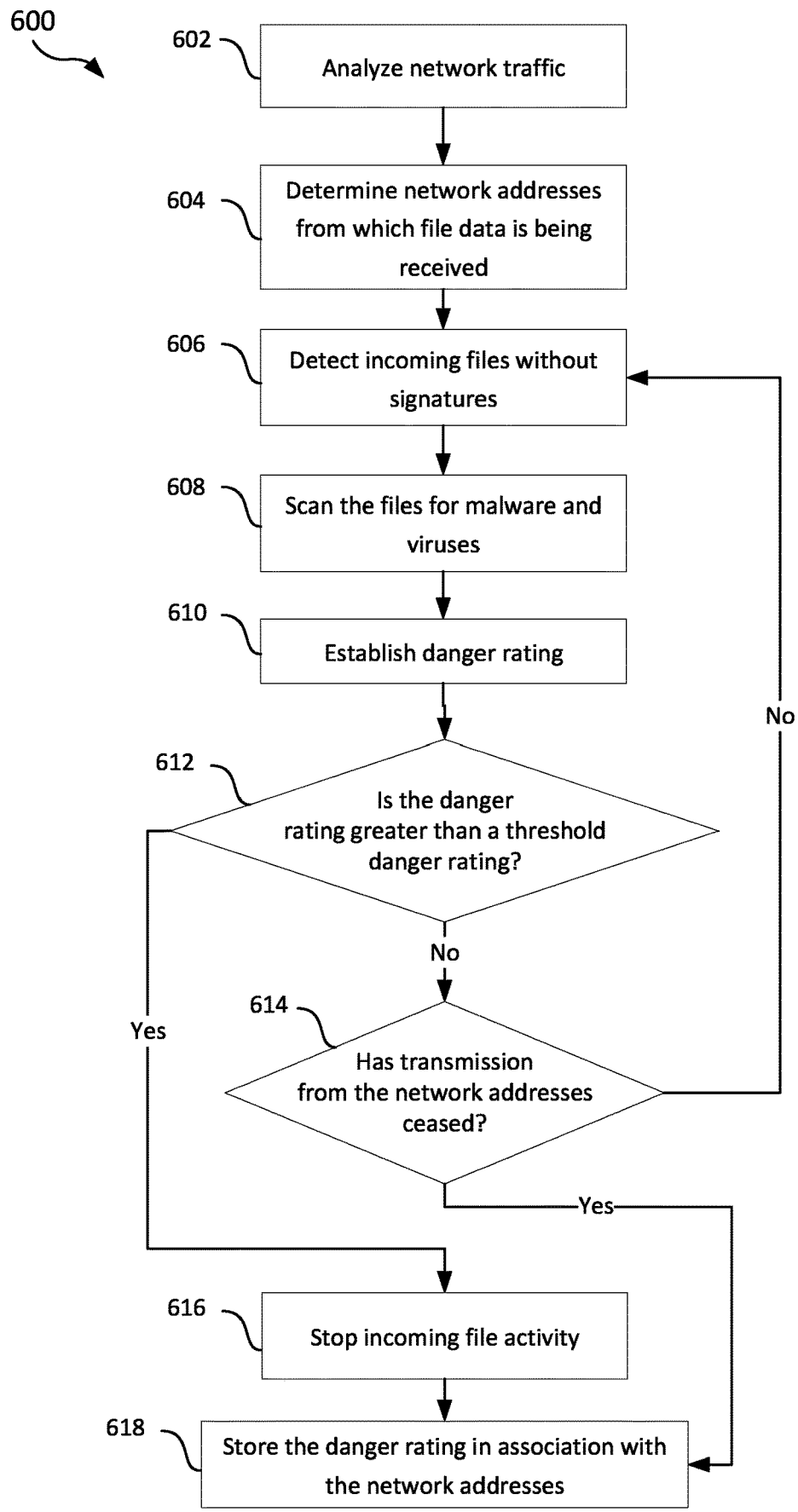
FIG. 6 is a flowchart illustrating a method of detecting unauthorized access to computing resources for cryptomining received from a network, in accordance with exemplary aspects of the present disclosure.

FIG. 6 is a flowchart illustrating a method 600 of detecting unauthorized access to computing resources for cryptomining received from a network, in accordance with exemplary aspects of the present disclosure.

Method 400 determines whether any cryptomining is occurring on the computing system at all. In exemplary aspects, method 600 distinguishes acceptable cryptomining from unauthorized or unacceptable cryptomining. Simply determining that cryptomining is occurring in a computer system is not enough, because the unauthorized cryptomining processes should be distinguished from alien cryptomining processes—otherwise method 400 may lead to false positives. Method 600 helps in eliminating false positive assumptions of cryptominers generated by method 400.

At 602, the cryptominer detector 101 analyzes network traffic incoming from the network to the computer system. For example, network filter driver 502 of detector 101 may receive data packets over network 501. Driver 502 may perform a statistical analysis indicating the number of packets being received from a particular source, the frequency at which the data packets are being sent, the size of the payloads, etc.

At 604, the cryptominer detector 101 determines one or more network addresses from which incoming files are being received and downloaded at the computer system. In some aspects, the cryptominer detector 101 determines the one or more network addresses using a network protocol analyzer. In some aspects, the network protocol analyzer may employ packet sniffing techniques to determine the source of the packets.

At 606, the cryptominer detector 101 detects the incoming files from the one or more network addresses that do not have a signature. For example, the cryptominer detector 101 may determine whether a signature is present in the data packets and tags the payloads where a signature is not found.

At 608, the cryptominer detector 101 scans the incoming files for viruses and malicious software (e.g., using AV scanner 508) as well as suspicious file structure (e.g., using PE analyzer 510) In some aspects, the incoming files/apps are monitored using a file system filter and dynamically linked libraries are monitored by tracing behavior of a given DLL using the calculated hash hum of the DLL. In further aspects, the cryptominer detector 101 determines whether an incoming file is a cryptominer when the incoming file performs one or more of the following: loads the CPU past a predetermined threshold, uses the command line, and/or accesses suspicious network addresses.

At 610, the cryptominer detector 101 establishes a danger rating for the source(s) associated with the one or more network addresses based on the scanning of the incoming files. This danger rating may change as more files are received and analyzed. The danger rating may be a numerical value that can be used to determine whether additional files should be accepted from a particular source. For example, the danger rating may be a value between 1 and 10 (where 10 is the maximum danger rating). It should be noted that the danger rating may also be expressed as a qualitative value (e.g., from "harmless" to "extremely dangerous."). Suppose that the cryptominer detector 101 detects 10 different packets from the one or more network addresses. Four of those packets may comprise unsigned files (i.e., without a digital signature). Based on this, the cryptominer detector 101 may assign a danger rating of 4. In response to determining that one of the four packets comprises a suspicious file structure, the cryptominer detector 101 may increase the danger rating to a 7. In response to determining that a newly received packet comprises malware, the cryptominer detector 101 may increase the danger rating of the source to 10. The degree to which the cryptominer detector 101 increases/decreases the danger rating may be predetermined or governed by a machine learning algorithm.

At 612, the cryptominer detector 101 determines whether the danger rating is greater than a predetermined threshold danger rating. For example, the threshold danger rating may be 7. If the current danger rating is 4 (i.e., less than the threshold danger rating), the source associated with the network addresses is not deemed dangerous (e.g., the source is not a cryptominer). Accordingly, method 600 proceeds to 614, where the cryptominer detector 101 determines whether additional transmissions are still being received that are from the network addresses. If additional transmissions (i.e., incoming files) are still being received, method 600 returns to 606. Otherwise, method 600 proceeds to 618, where the cryptominer detector 101 stores the danger rating in association with the network addresses in a database. Thus, at a later time, if additional files are received from the network addresses, the cryptominer detector 101 can refer to the stored danger rating and update accordingly.

In response to determining that the danger rating is greater than a threshold danger rating, method 600 proceeds to 616, where the cryptominer detector 101 stops the incoming files activity on the computer system. In some aspects, this involves halting receipt of all incoming files over the network and quarantining/removing all files previously received from the network addresses. From 616, method 600 advances to 618, where the danger rating is stored (i.e., to prevent acceptance of files from the network addresses at a later time).

Figure 7:
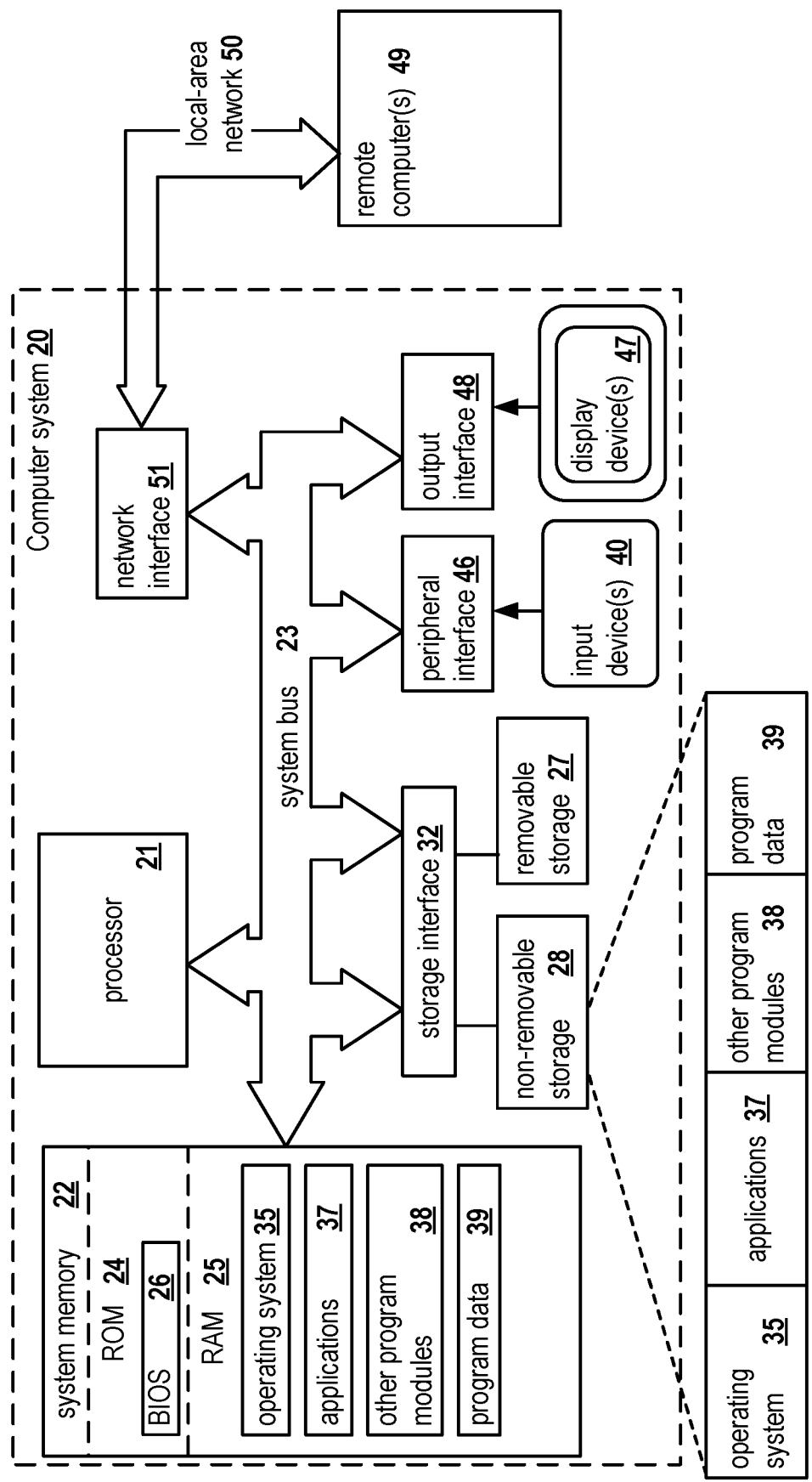
FIG. 7 is a block diagram of a computer system on which the disclosed system and method can be implemented according to an exemplary aspect.

FIG. 7 is a block diagram illustrating a computer system 20 on which aspects of systems and methods of detecting unauthorized access to computing resources for cryptomining may be implemented in accordance with an exemplary aspect. It should be noted that the computer system 20 can correspond to any components of the system 100 described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computer system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 7, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method of detecting unauthorized access to computing resources for cryptomining, comprising:
   detecting that at least one process has been launched on a computer system;
   in response to the detecting, collecting data related to the launch of the at least one process;
   comparing the collected data with behavioral rules specifying compliant behavior on the computer system;
   identifying suspicious behavior associated with the at least one process in response to determining that the collected data does not meet the behavioral rules, wherein the suspicious behavior is linked to cryptomining;
   generating an alert indicative of the suspicious behavior;
   in response to identifying the suspicious behavior, obtaining telemetry data of the computer system;
   receiving additional telemetry data from another computer system, wherein the additional telemetry data comprises additional characteristics of a cryptominer intrusion;
   identifying common characteristics between the telemetry data and the additional telemetry data; and
   updating the behavioral rules based on the telemetry data to improve accuracy of identifying further suspicious behavior by narrowing parameters of an existing rule of the behavior rules to fit within a parameter range indicated by the common characteristics.

2. The method of claim 1, further comprising ending the at least one process in response to identifying the suspicious behavior.

3. The method of claim 2, wherein the telemetry data comprises system data for a period of time between when the at least one process was launched and when the at least one process was ended, further comprising:
   receiving a confirmation that the suspicious behavior is associated with a cryptominer;
   tagging the telemetry data as characteristics of a cryptominer intrusion.

4. The method of claim 1, further comprising:
   adding a new rule to the behavior rule that evaluates parameters in the common characteristics.

5. The method of claim 1, wherein the behavioral rules are structured instructions comprising one or more of CPU load percentage of an application, port ranges to be tracked, IP addresses, and command line options.

6. The method of claim 5, wherein the behavioral rules indicate ranges or values for parameters that are acceptable and conform to non-suspicious behavior on the computer system.

7. The method of claim 1, wherein the collected data comprises one or more of command line usage, network usage, CPU consumption, process information, interceptors and event tracing.

8. The method of claim 1, wherein the at least one process excludes whitelisted and/or signed applications.

9. The method of claim 1, further comprising:
analyzing network traffic incoming from a network to the computer system;
determining one or more network addresses from which incoming files are being received and downloaded at the computer system;
detecting the incoming files from the one or more network addresses that do not have a signature;
scanning the incoming files for viruses and malicious software;
establishing a danger rating for a source associated with the one or more network addresses based on the scanning;
determining whether the danger rating is greater than a threshold danger rating; and
in response to determining that the danger rating is greater than the threshold danger rating, stopping activity of the incoming files on the computer system.

10. The method of claim 9, wherein determining the one or more network addresses is performed using a network protocol analyzer.

11. The method of claim 9, wherein monitoring the behavior of the incoming files comprises at least one of:
monitoring an application using a file system filter, and
monitoring a dynamically linked library by tracing behavior of the DLL using a hash sum of the DLL.

12. The method of claim 11, wherein the incoming files are DLLs, and the method further comprises:
determining that the incoming file is a cryptominer when the incoming files perform one or more of the following: load the CPU past a predetermined threshold, use the command line, and access suspicious network addresses.

13. A system of detecting unauthorized access to computing resources for cryptomining, comprising:
a hardware processor configured to:
detect that at least one process has been launched on a computer system;
in response to the detecting, collect data related to the launch of the at least one process;
compare the collected data with behavioral rules specifying compliant behavior on the computer system;
identify suspicious behavior associated with the at least one process in response to determining that the collected data does not meet the behavioral rules, wherein the suspicious behavior is linked to cryptomining;
generate an alert indicative of the suspicious behavior;
in response to identifying the suspicious behavior, obtain telemetry data of the computer system;
receive additional telemetry data from another computer system, wherein the additional telemetry data comprises additional characteristics of a cryptominer intrusion;
identify common characteristics between the telemetry data and the additional telemetry data; and
update the behavioral rules based on the telemetry data to improve accuracy of identifying further suspicious behavior by narrowing parameters of an existing rule of the behavior rules to fit within a parameter range indicated by the common characteristics.

14. The system of claim 13, wherein the hardware processor is further configured to end the at least one process in response to identifying the suspicious behavior.

15. The system of claim 14, wherein the telemetry data comprises system data for a period of time between when the at least one process was launched and when the at least one process was ended, and wherein the hardware processor is further configured to:
receive a confirmation that the suspicious behavior is associated with a cryptominer;
tag the telemetry data as characteristics of a cryptominer intrusion.

16. The system of claim 13, wherein the hardware processor is further configured to:
add a new rule to the behavior rule that evaluates parameters in the common characteristics.

17. The system of claim 13, wherein the hardware processor is further configured to:
analyze network traffic incoming from a network to the computer system;
determine one or more network addresses from which incoming files are being received and downloaded at the computer system;
detect the incoming files from the one or more network addresses that do not have a signature;
scan the incoming files for viruses and malicious software;
establish a danger rating for a source associated with the one or more network addresses based on the scanning;
determine whether the danger rating is greater than a threshold danger rating; and
in response to determining that the danger rating is greater than the threshold danger rating, stop activity of the incoming files on the computer system.

18. The system of claim 17, wherein the hardware processor is further configured to determine the one or more network addresses using a network protocol analyzer.

19. The system of claim 18, wherein the hardware processor is further configured to monitor the behavior of the incoming files by performing at least one of:
monitoring an application using a file system filter, and
monitoring a dynamically linked library by tracing behavior of the DLL using a hash sum of the DLL.

20. A non-transitory computer readable medium storing thereon computer executable instructions for detecting unauthorized access to computing resources for cryptomining, including instructions for:
detecting that at least one process has been launched on a computer system;
in response to the detecting, collecting data related to the launch of the at least one process;
comparing the collected data with behavioral rules specifying compliant behavior on the computer system;
identifying suspicious behavior associated with the at least one process in response to determining that the collected data does not meet the behavioral rules, wherein the suspicious behavior is linked to cryptomining;
generating an alert indicative of the suspicious behavior;
in response to identifying the suspicious behavior, obtaining telemetry data of the computer system;
receiving additional telemetry data from another computer system, wherein the additional telemetry data comprises additional characteristics of a cryptominer intrusion;
identifying common characteristics between the telemetry data and the additional telemetry data; and updating the behavioral rules based on the telemetry data to improve accuracy of identifying further suspicious behavior by narrowing parameters of an existing rule of the behavior rules to fit within a parameter range indicated by the common characteristics.

\* \* \* \* \*